(12) United States Patent
Ayoub

(10) Patent No.: US 10,839,472 B2
(45) Date of Patent: Nov. 17, 2020

(54) PREDICTIVE SYSTEM FOR USE WITH A MOBILE TRANSCEIVER TRACKING SERVICE

(71) Applicant: BlackBerry Limited, Waterloo (CA)

(72) Inventor: Sameh Ayoub, Ottawa (CA)

(73) Assignee: BlackBerry Limited, Waterloo (CA)

( * ) Notice: Subject to any disclaimer, the term of this patent is extended or adjusted under 35 U.S.C. 154(b) by 259 days.

(21) Appl. No.: 15/971,615

(22) Filed: May 4, 2018

(65) Prior Publication Data
US 2019/0340719 A1  Nov. 7, 2019

(51) Int. Cl.
| G01S 19/46 | (2010.01) |
| G01S 5/02 | (2010.01) |
| G06Q 50/28 | (2012.01) |
| G06Q 10/08 | (2012.01) |
| H04W 4/021 | (2018.01) |

(52) U.S. Cl.
CPC ........... *G06Q 50/28* (2013.01); *G06Q 10/087* (2013.01); *H04W 4/021* (2013.01)

(58) Field of Classification Search
CPC .. G06Q 10/20; G01M 99/05; G06F 17/30713; G06F 17/30241
See application file for complete search history.

(56) References Cited

U.S. PATENT DOCUMENTS

| 7,668,744 B2 | 2/2010 | Tiourine et al. |
| 7,783,507 B2 | 8/2010 | Schick et al. |
| 7,797,205 B2 | 9/2010 | Song et al. |
| 9,079,505 B1 | 7/2015 | Hyde et al. |
| 2005/0015399 A1 | 1/2005 | Melo et al. |
| 2007/0118502 A1 | 5/2007 | Aragones et al. |
| 2007/0239292 A1* | 10/2007 | Ehrman ................. G06Q 10/08 700/83 |
| 2008/0015955 A1* | 1/2008 | Ehrman ................. G06Q 40/02 705/28 |
| 2012/0191332 A1* | 7/2012 | Sawhill .................. G08G 5/045 701/120 |

(Continued)

FOREIGN PATENT DOCUMENTS

WO    2013052970 A1    4/2013

OTHER PUBLICATIONS

Extended European Search Report dated Jun. 4, 2019 from EP19172543.1, 9 pgs. Jun. 4, 2019.
Examiner's Report dated Jun. 29, 2020 from EP19172543.1, 7 pgs.

*Primary Examiner* — Talia F Crawley
(74) *Attorney, Agent, or Firm* — Jenna L. Wilson; Wilson Lue LLP

(57) ABSTRACT

A system and method for tracking and predicting usage of assets, such as shipping containers, trailers, or vehicles, based on usage data collected from a fleet of assets using mobile transceivers. During an evaluation term, a first plurality of messages comprising asset usage statuses is sent from the mobile transceivers to a tracking system. The usage statuses are used to compute a predicted quantity of assets expected to be used in a subsequent term. The predicted quantity is then allocated between a first subset of assets and a second subset of assets according to a minimal cost for the predicted quantity. In some embodiments, the first subset of assets comprising assets is associated with the mobile transceivers, and the second subset of assets comprising assets is not associated with the mobile transceivers.

20 Claims, 6 Drawing Sheets

(56) References Cited

U.S. PATENT DOCUMENTS

| | | | |
|---|---|---|---|
| 2015/0095336 A1* | 4/2015 | Green | G01S 5/02 |
| | | | 707/737 |
| 2016/0203435 A1 | 7/2016 | Waltniel | |
| 2016/0358129 A1 | 12/2016 | Walton et al. | |
| 2018/0040224 A1* | 2/2018 | Barcala | G06Q 10/0833 |
| 2018/0060832 A1* | 3/2018 | Korsedal, IV | G06Q 10/20 |
| 2018/0158019 A1* | 6/2018 | Vutukuri | H04W 4/35 |
| 2019/0279494 A1* | 9/2019 | Raasch | G06Q 50/28 |

* cited by examiner

PREDICTIVE SYSTEM FOR USE WITH A MOBILE TRANSCEIVER TRACKING SERVICE

TECHNICAL FIELD

This invention relates in general to techniques for managing transportation assets such as shipping containers and vehicles.

TECHNICAL BACKGROUND

Currently, fleet and asset tracking services make use of location services such as Global Positioning System (GPS) services and mobile transceivers affixed to movable assets, such as shipping containers, trailers, and transport vehicles, to track the geographic location of the assets in real time or near-real time. Some systems, such as the BlackBerry® Radar service offered by BlackBerry Limited, Waterloo, Canada, may provide track fleet status beyond merely geographic location, such as dwell time, door open/close status, and environmental information to provide the operator with more robust management capabilities.

BRIEF DESCRIPTION OF THE DRAWINGS

In drawings which illustrate by way of example only embodiments of the present invention.

DETAILED DESCRIPTION

Figure 1:
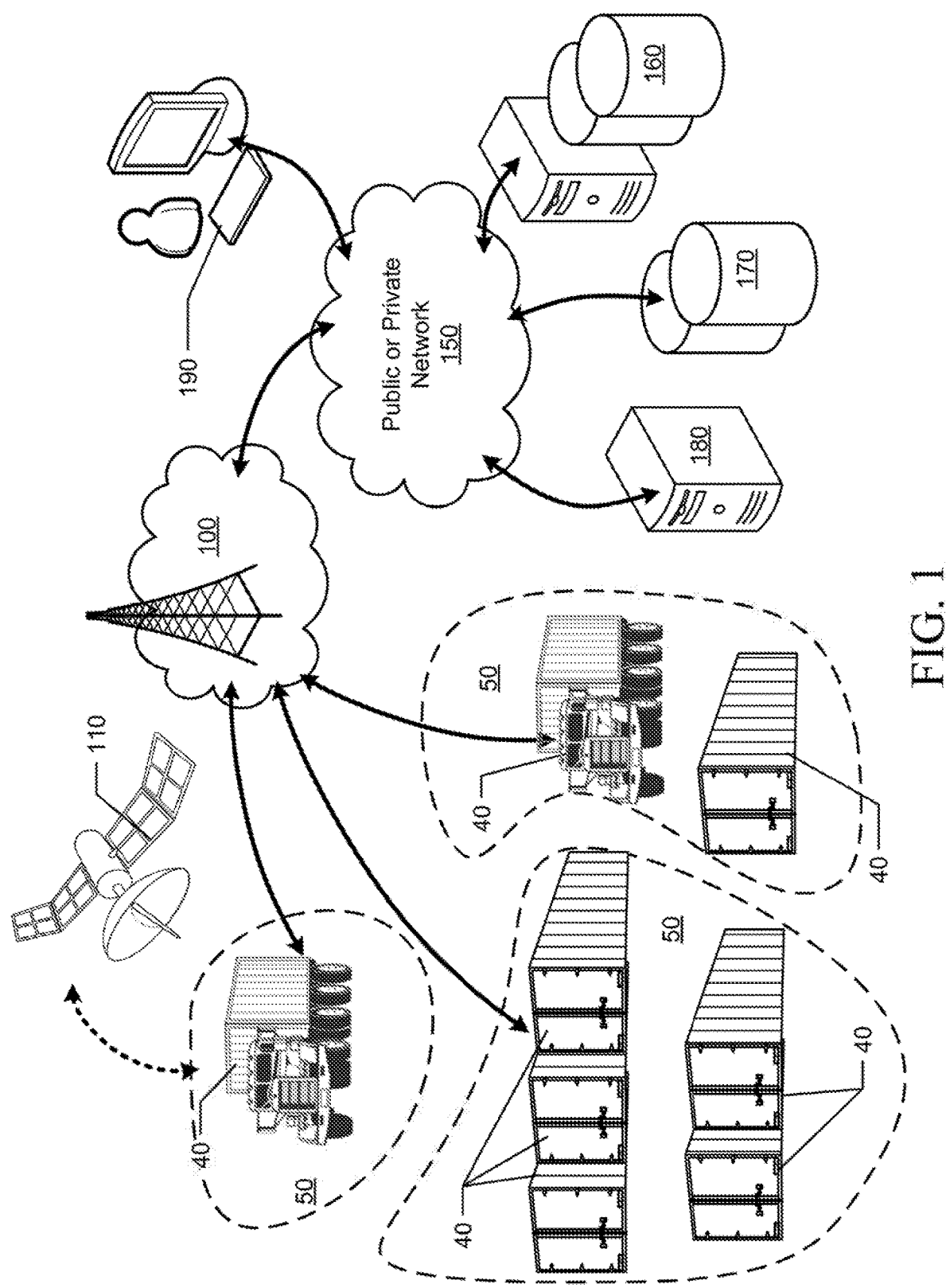
FIG. 1 is a schematic diagram of an example networked data processing environment of the invention.

As noted above, mobile transceivers may be used to track the location and status of assets for the purpose of fleet management. For instance, a Global Navigation Satellite System (GNSS) tracking device, such as a GPS tracking device, can be installed on a physical asset. The tracking device may measure the location, and optionally other characteristics, of the asset at regular intervals using the GNSS and log the data in internal memory for subsequent download and analysis by a management system or a central system. While typical tracking devices have generally limited power (e.g., battery operated) and/or limited processing resources, they may be equipped with one or more environmental sensors that can gather data such as light level, temperature, pressure, and/or humidity, among other environmental characteristics. Such characteristics can be used in analysis to infer the usage status of the asset; for example, whether it was in use or idle.

Some tracking devices may include a wireless communication subsystem permitting the device to transmit the data to a remote system, even while the asset is in transit; this permits the operator to have a real-time or near-real time report of the location and status of the asset.

Implicit to the management of a fleet or similar set of assets is the acquisition of new assets according to predicted need, maintenance of existing assets, and storage of assets not currently in use. Each of these activities incurs a corresponding cost that is not merely financial, but includes the physical resources required for storage and maintenance. Overestimating the number of assets to be purchased and added to the fleet in a future period results in excess inventory occupying additional space and requiring maintenance, not to mention wasted expense. On the other hand, underestimating the number of assets required for the future period may result in the operator having to rent assets at short notice, and at higher cost than if they had previously purchased the asset. To complicate matters, the utilization rate of an operator's assets is not constant during the year; the number of assets actually in use at a given time will fluctuate according to customer need. Thus, historically, it has been found safer to overestimate the required purchases and to simply purchase all assets that are thought would be required, with the concomitant waste of expense and physical resources.

The present disclosure therefore provides a system and method for managing tracked fleets of assets, such as shipping containers, trailers, vehicles and the like, which may use mobile transceivers to determine an optimal number of new assets to be acquired in a given budget period based on historical utilization rates. The present system retrieves historical usage data for an evaluation term (e.g., a calendar year, although another length of time may be selected) to determine a predicted quantity of assets that will be required in a subsequent term (e.g., the subsequent calendar year). The prediction may be at least as granular as the historical usage data available. Thus, if hourly, daily, weekly, or monthly usage data for the assets is available for the evaluation term, the predicted quantity for the subsequent term may likewise be hourly, daily, weekly, or monthly to enable the operator to plan asset acquisition more precisely.

FIG. 1 illustrates an example networked data processing environment in which the inventive concepts of the system and method may be implemented, including a number of participant data processing systems and/or data repositories 160, 170, 180, 190 and tracked mobile assets 40. Each of the assets 40 may be a shipping container, trailer, vehicle or the like. The operator using the system may logically or physically divide the assets 40 in more than one region or grouping 50. In the examples described herein, regions 50 are geographical regions. They may be defined according to jurisdiction (e.g., each region 50 may correspond to a state, province, municipality, county, or the like) or by other rules. The boundaries of a region 50 may further be virtually marked by a geofence, for example using GPS techniques known in the art. Each asset 40 in this example has a mobile transceiver 200 (not shown in FIG. 1) mounted or affixed to it. The mobile transceiver 200 is described in more detail in FIGS. 2-4. The mobile transceiver 200 is configured to collect data relating to its associated asset 40 by means of sensors and communication interfaces.

Typically, the mobile transceiver 200 uses the cellular network 100 to access an asset tracking system 160 (e.g., a server or a fleet management system). The asset tracking system 160 may be implemented as one or more server modules and is typically located behind a firewall. The asset tracking system 160 provides administrative control and management capabilities over the mobile transceivers 200.

The asset tracking system 160 may be embodied as a variety of configurations, in hardware or software, including a server-based system, an Application Programming Interface (API) and/or endpoint that provides access and abstraction of the functionality of asset tracking system 160 such that no hardware or configuration information is necessary to access the functionality other than the API location and functional definitions. Encryption according to an accepted standard may be applied to the communications between the asset tracking system 160 and the transceivers 200 to ensure secure transmission.

The transceiver 200 may obtain location data from a GNSS, represented by satellite system 110. In some embodiments, the satellite network 110 comprises a plurality of satellites which are part of at least one Global Navigation Satellite System (GNSS) that provides autonomous geospatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system (IRNSS), and the Japanese Quasi-Zenith Satellite System. Sensors of the mobile transceiver 200 are discussed below. The location data and sensor data may be collected by the transceiver 200 according to a fixed schedule, e.g. at regular intervals, or alternatively in response to a detected trigger event. As noted above, the collected data may be stored internally in the mobile transceiver 200 for subsequent download and analysis, or may alternatively be transmitted over a wireless connection for real-time or near-real time analysis according to a defined schedule, or in response to triggering events.

As shown in FIG. 1, transmissions from the mobile transceiver 200 of each asset 40 may be sent over a cellular network 110 and thence to the tracking system 160 via a public or private network 150, such as the Internet or any other suitable network. The tracking system 160 stores the received data from the transceivers 200 for reports and analysis. An operator may access the reports and analyses for their assets 40 via a management system, which may be implemented on a client terminal or computer 190. Additional data concerning utilization of assets 40 that are not tracked using the mobile transceivers 200 may be stored in additional data repositories such as external system(s) 170. A recommender or predictive system 180 is also provided and operates as described below. Each of the predictive system 180, external system(s) 170, client management system 190 and tracking system 160 are depicted in FIG. 1 as independently operating and remote systems communicating over the public or private network 150. However, those skilled in the art will appreciate that the functionality of one or more of these components may be further distributed over the network 150 (i.e., consistent with a cloud computing paradigm) or consolidated; for instance, the tracking system 160 and predictive system 180 may be implemented on the same computer system or site, as may be the management system 190.

Figure 2:
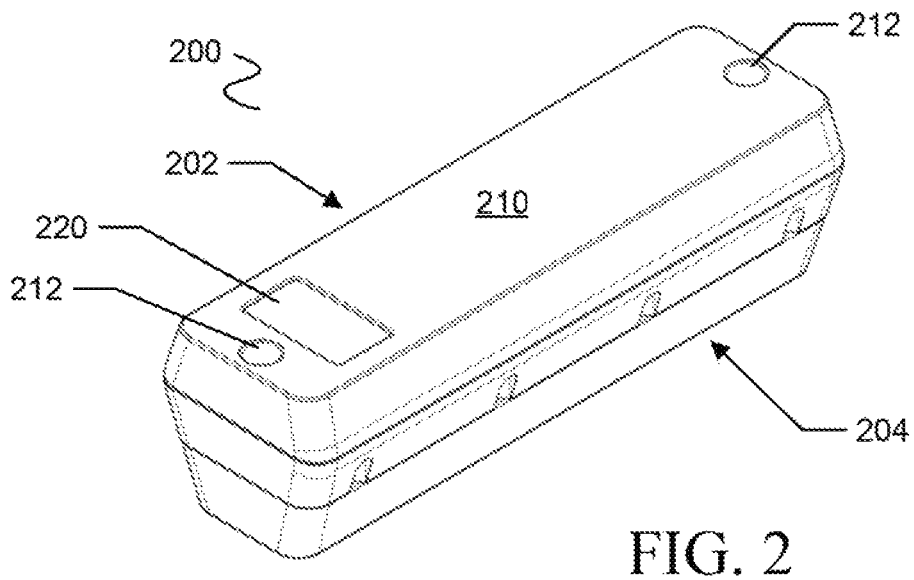
FIG. 2 is a perspective view of a housing for a mobile transceiver for use in tracking assets.
Figure 3:
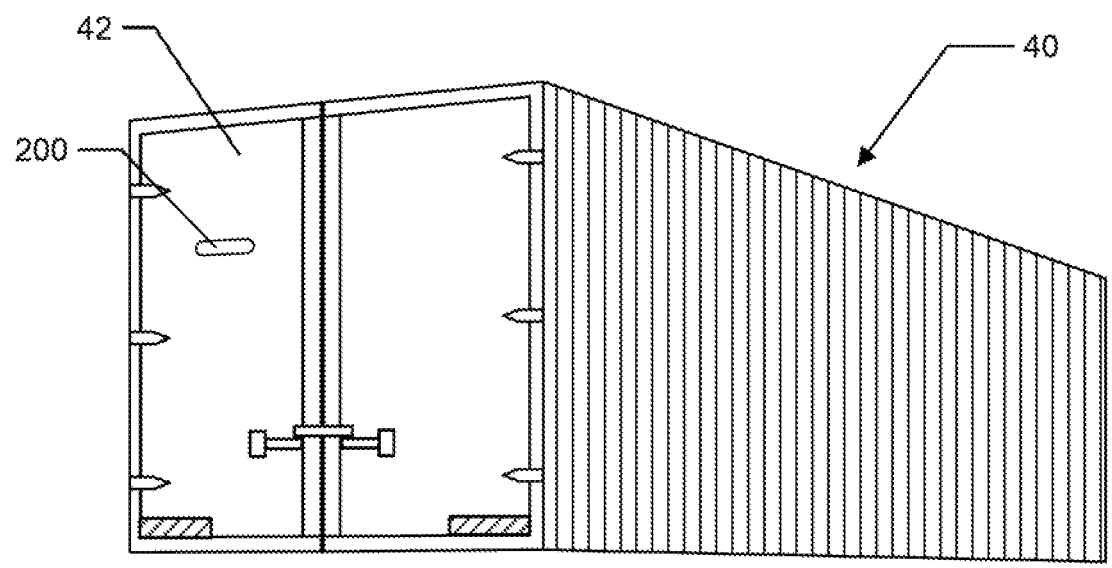
FIG. 3 is a perspective view of the mobile transceiver of FIG. 2 mounted on a shipping container door.

Turning to the mobile transceiver 200, when used with assets 40 such as shipping containers or trailers, is conveniently configured in a two-part, interconnected module that enables external communications via one or more antennas and monitoring of the interior of the asset. FIG. 2 illustrates one example transceiver 200 with a housing 210, comprising a mating exterior portion 204 and interior portion 202. The exterior and interior portions 204, 202 can be mounted on a wall or a door of a shipping container, for example as illustrated in FIG. 3, which shows a mobile transceiver 200 affixed in the door 42 of a shipping container. In such an example, holes are drilled in the door 42 to permit passage of mounting screws or bolts and electronics components of the transceiver 200 therethrough. The exterior and interior portions 204, 202 are connected to each other through the door 42 by means of the screws or bolts, which pass through holes 212. In this type of configuration, the exterior portion 204 carries at least the antennas required for external communication, and the interior portion contains the remainder of the components. In the example of FIG. 2, the interior portion 202 includes a light transmissive panel 202 which receives light for detection by an interior light sensor. The outer surface of the interior portion 202 may be provided with other sensor devices or interfaces as required to enable the mobile transceiver 200 to monitor any desired environmental conditions associated with the asset. Other sensors may not require such an interface. For example, the mobile transceiver 200 mounted in the door 42 may be able to detect a door open or close state by means of a gyroscope or accelerometer inferring movement of the door.

Figure 4:
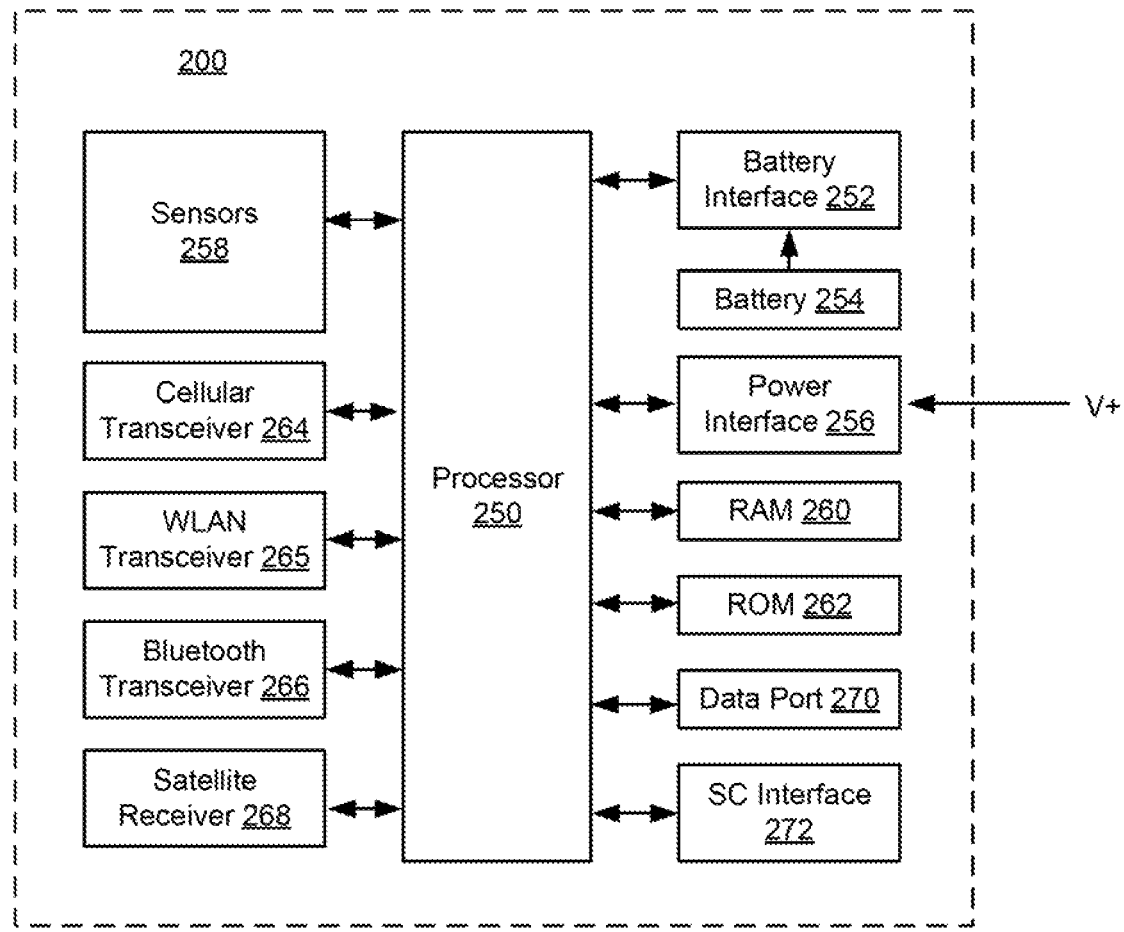
FIG. 4 is a block diagram illustrating select features of a mobile transceiver for use in tracking assets.

A schematic of selected components of the mobile transceiver 200 is illustrated in FIG. 4. The mobile transceiver 200 comprises at least one processor 250 which controls its overall operation. The processor 250 is coupled to a plurality of components via a communication bus or other means (not shown), such as random access memory (RAM) 260, read-only memory (ROM) 262, optional flash memory (not shown) or other data storage devices. The mobile transceiver 200 may also include a data port 270, which may be a Universal Serial Bus (USB) port or the like; a smart card interface 272; and a set of environmental sensors 258. The sensors 258 may include light sensors, temperature sensors, pressure sensors, humidity sensors, gyroscopes, accelerometers, time-of-flight sensors, and optionally other sensors such as contact switches. The example mobile transceiver 200 also includes a satellite receiver 268 for receiving satellite signals from a satellite network 110 (shown in FIG. 1), for example satellites that are part of a global or regional satellite navigation system. In some embodiments, a satellite transceiver capable of both receiving and sending satellite signals may be provided instead of a satellite receiver which can only receive satellite signals. Signals received by the satellite receiver 268 are used to determine the mobile transceiver's position.

The mobile transceiver 200 also comprises one or more wireless transceivers for exchanging data communication, and optionally voice communication. For example, the transceivers may comprise a cellular transceiver 264 for communicating with a plurality of different radio access networks, such as the cellular network 100 (shown in FIG. 1), using different wireless data communication protocols and standards. The mobile transceiver 200 may communicate with any one of a plurality of fixed transceiver base of the cellular network 100 within its geographic coverage area. The mobile transceiver 200 may send and receive signals over the cellular network 100 after the required network registration and/or activation procedures have been completed. In the described embodiment, the cellular transceiver 264 is a multi-band transceiver that supports multiple radio frequency bands which may include, for example, multiple 4G Long-Term Evolution (LTE) or LTE Advanced and/or 5G bands (where available), as well as global 3G and 2G bands. In other embodiments, multiple dedicated transceivers may be provided to support different wireless services. Examples of technologies that may be used by the cellular transceiver 264 will be known to those skilled in the art. Any encryption/decryption, compression/decompression, and network access protocols that may be used in connection with the radio access network, or indeed in connection with the WLAN and short-range communications discussed below, will likewise be understood by those skilled in the art. The smart card interface 272 may be used to receive a suitable subscriber identity module (SIM) to enable wireless access.

The wireless transceivers may also comprise a wireless local area network (WLAN) transceiver 265 for communicating with a WLAN via a suitable access point. The WLAN may comprise a Wi-Fi wireless network which conforms to IEEE 802.11x standards (sometimes referred to as Wi-Fi®). Other communication protocols may be used for the WLAN.

The wireless transceivers may also comprise a short-range wireless transceiver, such as a Bluetooth® transceiver 266, for communicating with a nearby device. The mobile transceiver 200 may alternatively communicate with the nearby device using the data port 270. The Bluetooth transceiver 266 may be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as Ultra-Wideband (UWB)), Z-Wave, ZigBee, ANT/ANT+ or infrared (e.g., Infrared Data Association (IrDA) communication).

The mobile transceiver 200 also includes a battery 254 as a power source. The battery 254 may be a rechargeable or non-rechargeable battery, and in some embodiments may be a large-capacity, non-rechargeable, sealed battery expected to have a relatively long service life, e.g., 5-7 years of active service. The battery 254 provides electrical power to at least some of the components of the mobile transceiver 200. A battery interface 252 provides a mechanical and electrical connection for the battery 254. The battery interface 252 may be coupled to a regulator (not shown) which provides power V+ to the circuitry of the mobile transceiver 102.

The mobile transceiver 200 may also include a power interface 256, such as a power port, for connecting to an external power source (not shown) such as an alternating current (AC) power adapter. The mobile transceiver 200 can use the external power source rather than the battery 254. If the battery 254 is rechargeable, the external power source may be used to recharge the battery 254. Further description of an exemplary mobile transceiver 200 is provided in U.S. Pat. No. 9,742,479, which is incorporated herein by reference.

In the context of fleet asset management, consider the example of an operator with an initial fleet of assets equipped with mobile transceivers 200. This initial fleet may be considered to be "owned" assets, which in this case are associated with the operator's fleet by the mobile transceivers 200. By contrast, assets that will be used by the operator but that are not "owned" may instead be "rented" assets, and consequently may not be equipped with mobile transceivers 200 associated with the operator. The operator wishes to determine, based on a predicted quantity of assets expected to be in use over the following term (e.g., over the coming year), a cost-effective number of assets to own and rent.

The following term may be divided into a set of p use periods i. For example, i may be days, and the term may be a year, so p=365. For a given use period i, the cost of owned and rented assets $C_i$ is $$C_i(n_o) = C_o n_o + C_r n_i$$

where $n_o$ is the number of owned assets; $n_i$ is the number of rented assets during the sampling period, $C_o$ is the cost of ownership of an asset, and $C_r$ is the cost to rent. In a simple implementation, $C_o$ may reflect the consumption of storage and maintenance resources, and $C_r$ is assumed to be the same for each rented asset, while $n_i$ may vary for each period i. Furthermore, the total number of assets during period i, $n_o + n_i = N_i$, is the predicted quantity of assets expected to be used during period i. The details of obtaining the predicted quantity $N_i$ is discussed below. $n_o$ is presumed to be constant for a given i; however, it may take any value from 0 (i.e., all assets during the term are rented) to the maximum value of $N_i$ during period p (all assets during the term are owned).

Thus, for the entire term for a given $n_o$, the total cost is $$C_{tot}(n_o) = \sum_{i=0}^{p} C_i(n_o)$$

To minimize operating costs, appropriate values of $n_o$ and $n_i$ may be found. One means is to determine the value of $0 \leq n_o \leq \max(N_i)$ yielding the minimum value of $C_{tot}(n_o)$, i.e.

$$\operatorname{argmin}_{n_o}\left[\sum_{i=0}^{p} (C_o n_o + C_r n_i)\right]$$

using any suitable algorithm.

Figure 5:
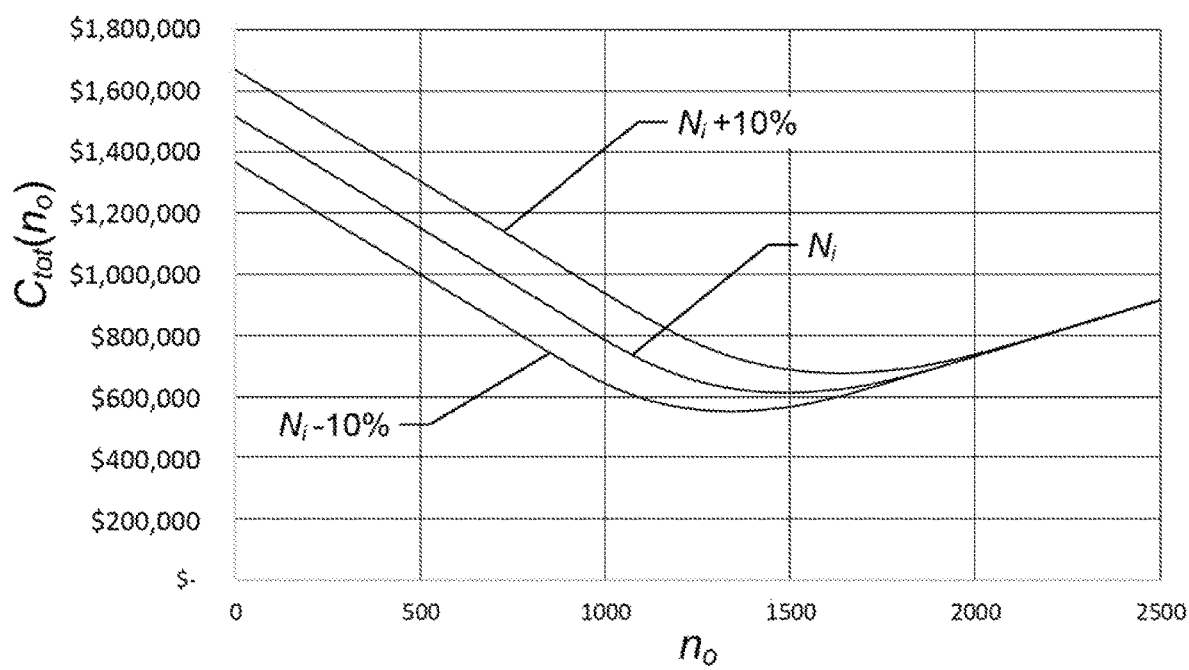
FIG. 5 is a graph illustrating projected costs of assets for a defined period of time as a function of the size of an invariable subset of assets.
Figure 6:
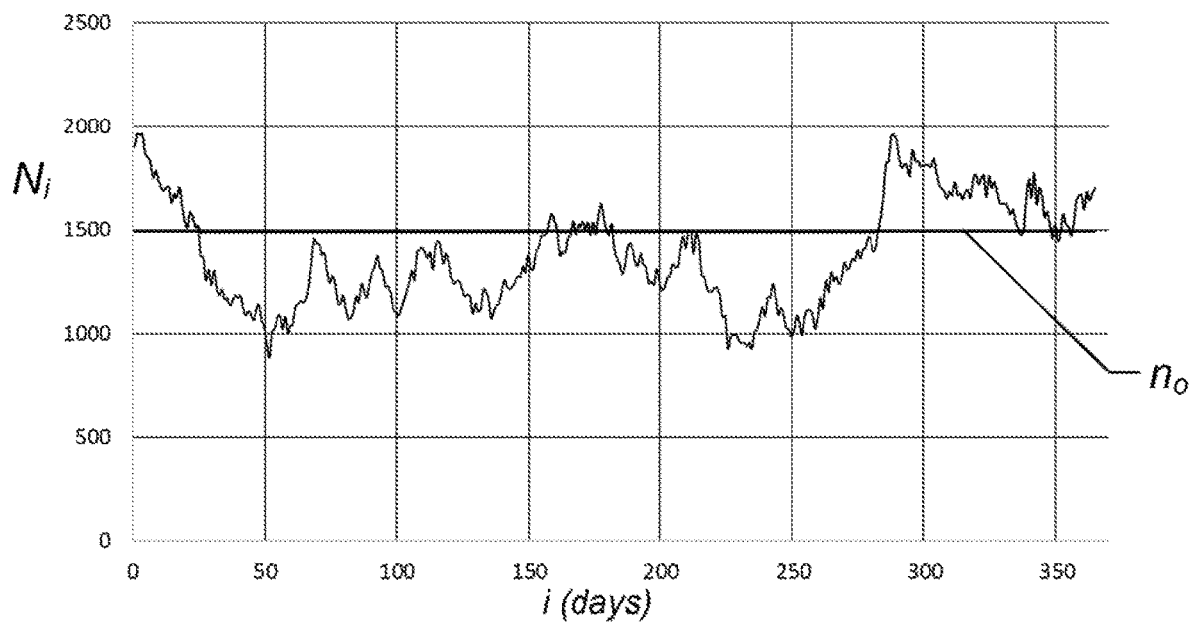
FIG. 6 is a graph illustrating projected utilization of assets as a function of time.

It may be observed that in the context of ongoing operations, an operator may already own a number of assets already; thus, the cost of ownership of the asset may be limited to normal maintenance costs, as well as storage costs when the asset is not in use. In such a scenario, the cost of ownership may be expected to be less than the cost of rental during any period i FIGS. 5 and 6 illustrate the determination of optimal $n_o$, in a scenario where $1 \leq i \leq 365$ days, $C_o$ is $1, $C_r$ is $3, and $N_i$ ranges between 885 and 1963. Referring briefly to FIG. 6, the fluctuation of $N_i$ over the span of p use periods is shown.

In this example, $n_o$ is determined to be 1490. This is demonstrated by the graph of FIG. 5, which shows the computation of $C_{tot}(n_o)$ for a range of $n_o$ from zero to 2500, based on $N_i$ as shown in FIG. 6. FIG. 5 also shows examples of varying usage forecasts for the following term, which in this case vary by ±10%. It can be seen that minimum $C_{tot}(n_o)$ for $N_i$ is obtained at 1490; in other words, when the predicted use of assets follows $N_i$ as depicted in FIG. 5, the operator's associated cost is minimized when the operator owns only 1490 shipping containers (for example) and rents additional shipping containers as needed, despite the fact that rental is more costly. The calculations depicted in FIG. 5, including the plus/minus calculations, can be used by the operator to gauge the effect of different predictions.

Returning to FIG. 6, it can be seen that $N_i$ fluctuates above and below the optimal $n_o$. If the operator owns exactly 1490 assets—the optimal amount to be owned—then during those use periods i where $N_i > n_o$, according to this model the operator must obtain $N_i - n_o$ assets by rental. During those periods i where $N_i \leq n_o$, the operator only requires the owned assets, and no rental is necessary. Conceptually, the predicted quantity of assets $N_i$ may be allocated into two subsets: owned assets, and rented assets. The subset of owned assets is substantially invariant for all i (as can be seen in FIG. 6, the quantity 1490 is constant), but the rented assets subset varies according to i.

The costs $C_o$ and $C_r$ defined above were generally considered to be fixed. However, those skilled in the art will appreciate that these values may be refined to reflect variations over the course of p use periods, or cost of purchasing additional assets (for example, if the operator does not already own 1490 assets in the example of FIGS. 5 and 6, then these assets must be purchased).

Figure 7:
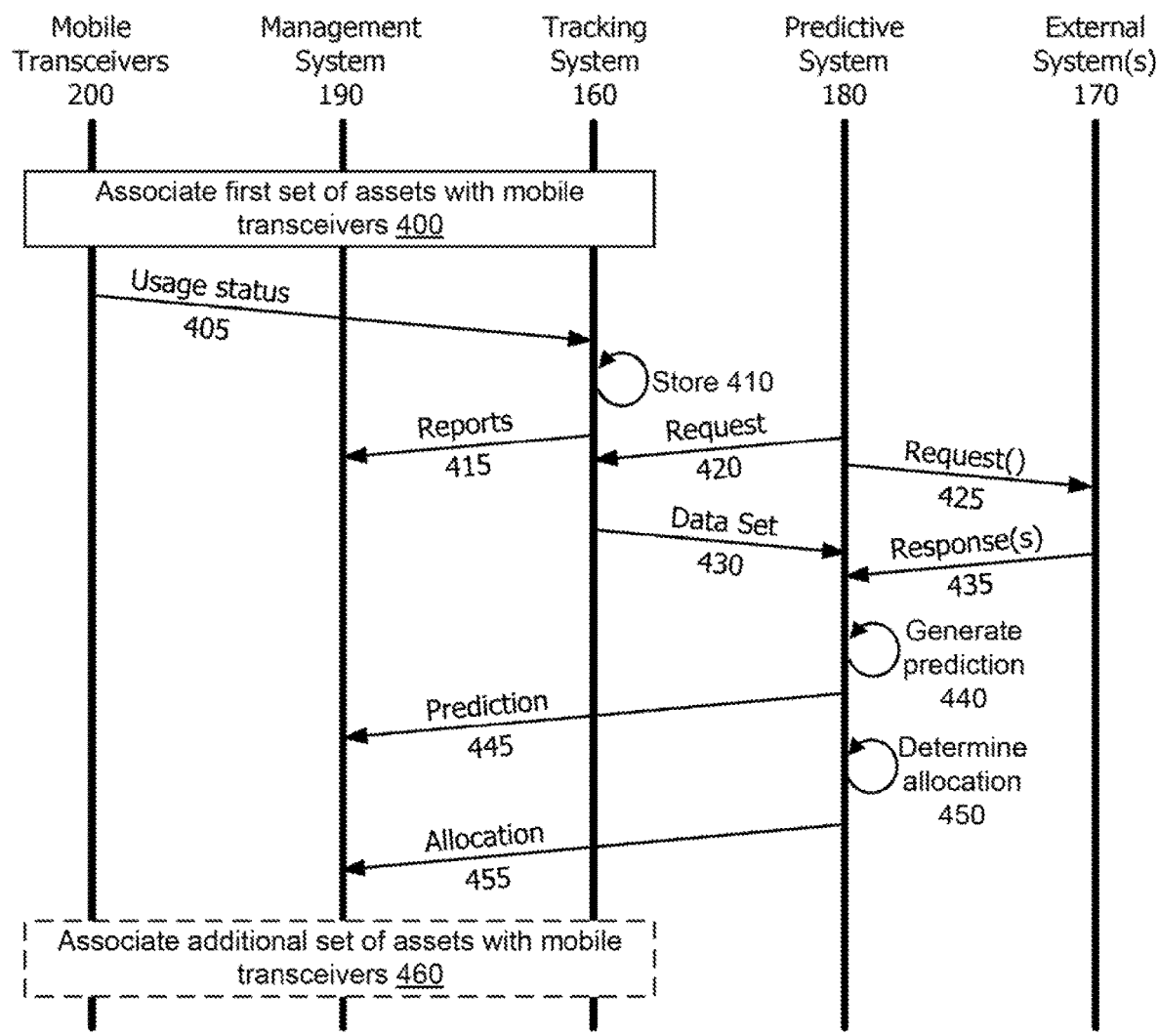
FIG. 7 is a communication diagram illustrating message flow between various components of the operating environment of FIG. 1.

The values of $N_i$ can be usefully obtained from tracking data previously collected during an evaluation term or period from the mobile transceivers 200 operating in the environment of FIG. 1. An example process is illustrated in FIG. 7, in a scenario where the operator already owns a first set of assets, each equipped with mobile transceivers 200. At 400, the mobile transceivers 200 are associated with their corresponding assets 40 in the tracking system 160, and optionally management system 190. As the assets are utilized during an initial evaluation term (for example, a calendar year), at 405 usage status and associated information is transmitted in messages by the mobile transceivers 200 of each asset 40 to the tracking system 160. As described above, each mobile transceiver 200 may transmit location and sensor data to the tracking system 160. This data, together with a concurrent timestamp, may comprise the usage status. Furthermore, depending on the configuration of the mobile transceiver 200, the mobile transceiver 200 may also be configured to generate an "in use" or "idle" status based on the data collected by the sensors 258; for example, detection of a change to a door open state, or entrance into or exit from a defined geofenced region may correspond to an "in use" status, whereas no detected change to any sensor data may correspond to an "idle" status. This "in use" or "idle" status may be included in the usage status 405.

The tracking system 160 stores the received usage status at 410. If the "in use" or "idle" is not included in the usage status messages 405, then the tracking system 160 may generate this "in use" or "idle" status and also stores it at 410. Periodically or on request, usage reports 415 may be generated and sent by the tracking system 160 to the management system 190 for use by the operator in managing the fleet of assets.

Once the evaluation term is concluded, $N_i$ may be computed based on the usage statuses collected during the evaluation term. The predictive system 180 requests 420 data from the tracking system 160 about the usage of the assets belonging to the first set (i.e., the assets associated with the operator of the management system 190). A data set 430 is returned to the predictive system 180. The granularity of the data obtainable by the predictive system 180 will depend on the data available from the tracking system 160. For example, the mobile transceivers 200 may be configured to transmit and collect usage status in messages 405 every few seconds or minutes, every hour, once a day, or at any suitable frequency. The predictive system 180 may therefore request and receive data with the same granularity as that received by the tracking system 160. However, to reduce the volume of transmitted data, the predictive system 180 may only request a subset of the stored data to be delivered in the data set 430.

In particular, the predictive system 180, since it is computing $N_i$, may request a data set reflecting usage of the assets 40 at a frequency corresponding to i. For example, even if the tracking system 160 stores hourly data for the first set of assets 400, the predictive system 180 will only request daily data for the previous year if it is only required to determine $N_i$ on a daily basis for a term of 365 days. Furthermore, the predictive system 180 may not require all types of data collected by the tracking system 160; for instance, location data may be omitted from the data set 430.

It should be noted, however, that the frequency of $N_i$ calculated by the predictive system 180 is likewise limited by the granularity of data available from the tracking system 160. If the tracking system 160 stores only weekly usage information about the assets, then $N_i$ can only be estimated by the predictive system on a weekly basis. It should be noted, however, that additional information relevant to predicted $N_i$ may be found in other repositories, such as external system(s) 170. For example, usage information about other assets of the operator that are not tracked using mobile transceivers 200 may be stored in an external system 170; information about projected increases or decreases in usage based on existing contracts or tenders may also be stored in an external system 170 or the management system 190. This information may have different granularity than the usage information stored by the tracking system 160. Information stored in an external system 170 (or the management system 190) may be requested 425 by the predictive system 180; the responses 435 may also be used as input along with the data set 430 to generate the predicted $N_i$ at 440. The values of $N_i$ may then be optionally transmitted to the management system 190 for presentation to the operator at 445.

Next, the predictive system 180 then determines how $N_i$ should be allocated between the two subsets of assets: the owned assets $n_o$ and rented assets $n_r$. As described above, this may be determined by finding the $n_o$ yielding the minimum value of $C_{tot}(n_o)$. The values $n_o$ and $n_r$, and optionally supporting calculations and information, may be transmitted to the management system 190 for presentation to the operator at 455. The operator may then take steps to acquire additional assets either by purchase or rental according to the computed values.

As noted above, if the operator's currently owned assets (e.g., the assets in the first set of assets) exceed $n_o$, there is no need for the operator to purchase additional assets. On the other hand, if the operator procures further owned assets and installs mobile transceivers 200 on these new assets, these additional assets would be associated with the mobile transceivers 200 by the tracking system 160 at 460.

It should be recalled that in the foregoing example, owned assets were distinguishable from rented assets by the association of the owned assets with mobile transceivers 200. However, the rented assets may also be associated with different mobile transceivers. Furthermore, some or all owned assets may not be associated with mobile transceivers; if this is the case, then historic usage data would likely be obtained by the predictive system 180 from the external system(s) 170.

The operator may manage a plurality of fleets of assets associated with different regions. These different regions may be defined geographically or by other means, as discussed above. The predictive system 180 described above may operate on a region-by-region basis; that is to say, for a given first region, the historic usage data of assets in other regions during the evaluation term is not used to predict $N_i$. Alternatively, the historic usage data of the other regions may be considered as well.

In a further variant, the predictive system 180 is used to determine $N_i$ as well as optimal $n_o$ for each of the plurality of regions associated with the operator. If the optimal $n_o$ for a first region is smaller than the number of assets owned by the operator in that region—in other words, if there are owned assets in the first region that are not required and may be considered "unused", it may be more cost-effective to temporarily move those assets to a second region where optimal $n_o$ is greater than the number of owned assets in that region. Thus, in this scenario, unused assets normally associated with the first region may be temporarily associated with the second region and considered to be "owned" assets in the second region, along with the actual owned assets in the second region.

The system and method described above thus provides for determination of an optimal number of assets to own or rent based on historic usage data. In one embodiment, there is provided a method comprising: associating a first plurality of assets with a corresponding first plurality of mobile transceivers in records stored in a data processing system, each mobile transceiver of the first plurality of mobile transceivers being physically affixed to a corresponding asset of the first plurality of assets; the data processing system receiving, during an evaluation term, a first plurality of messages from the first plurality of mobile transceivers, the first plurality of messages comprising asset usage statuses for the first plurality of assets; storing the asset usage data in the data processing system; the data processing system determining, using the stored asset usage data, a predicted quantity of assets expected to be used in a subsequent term; and the data processing system allocating the predicted quantity of assets between a first subset of assets and a second subset of assets according to a minimal cost for the predicted quantity, wherein the first subset of assets is associated with a first cost and the second subset of assets is associated with a second cost, the first subset of assets comprising assets associated with the first plurality of mobile transceivers, the second subset of assets comprising assets not associated with the first plurality of mobile transceivers.

In one aspect, when a number of assets in the first subset of assets is greater than a number of assets in the first plurality of assets, the method further comprises associating a second plurality of assets with a corresponding second plurality of mobile transceivers in records stored in the data processing system, each mobile transceiver of the second plurality of mobile transceivers being physically affixed to a corresponding asset of the second plurality of assets; and including the second plurality of assets in the first subset of assets.

In a further aspect, the method further comprises associating a further plurality of assets with a corresponding further plurality of mobile transceivers in records stored in a data processing system, each mobile transceiver of the further plurality of mobile transceivers being physically affixed to a corresponding asset of the further plurality of assets; the data processing system receiving, during the evaluation term, a further plurality of messages from the further plurality of mobile transceivers, the further plurality of messages comprising further asset usage statuses for the further plurality of assets; storing the further asset usage data in the data processing system; the data processing system determining, using the stored further asset usage data, a predicted quantity of unused assets of the further plurality of assets that are expected to be unused in the subsequent term; when a number of assets in the first subset of assets is greater than a number of assets in the first plurality of assets, including at least some of the assets of the further plurality of assets in the first subset of assets.

In one aspect, the first cost is less than the second cost.

In another aspect, the assets comprise shipping containers, and the asset usage statuses comprise statuses corresponding to a shipping container in use, and at least one status corresponding to a shipping container not in use, and wherein the predicted quantity of assets is determined at least in part from a number of assets in the first plurality of assets having a status corresponding to a shipping container in use during the evaluation period.

In still a further aspect, the statuses correspond to a shipping container in use comprise exit from a geofenced region, entrance into a geofenced region, and door open.

In another aspect, the evaluation period and the subsequent period each comprises a set of use periods; the messages of the first plurality of messages are received during each of the use periods from each of the assets of the first plurality of assets; and determining the predicted quantity of assets expected to be used in the subsequent term comprises determining a predicted quantity of assets expected to be used for each use period of the subsequent period based on the stored asset usage data for the corresponding use period of the evaluation period.

In a further aspect, determining the predicted quantity of assets expected to be used in the subsequent term further comprises adjusting an initial predicted quantity of assets based on the stored asset usage data according to external information about either a predicted increase or a predicted decrease in usage of assets for the subsequent term.

In another aspect, determining the predicted quantity of assets expected to be used in the subsequent term further comprises adjusting an initial predicted quantity of assets for a selected use period according to external information about either a predicted increase or a predicted decrease in usage of assets for the selected use period.

There is also provided a data processing system that is configured to implement the above-described aspects.

The examples and embodiments are presented only by way of example and are not meant to limit the scope of the subject matter described herein. Variations of these examples and embodiments will be apparent to those in the art and are considered to be within the scope of the subject matter described herein. For example, some steps or acts in a process or method may be reordered or omitted, and features and aspects described in respect of one embodiment may be incorporated into other described embodiments.

The data employed by the systems, devices, and methods described herein may be stored in one or more data stores. The data stores can be of many different types of storage devices and programming constructs, such as RAM, ROM, flash memory, programming data structures, programming variables, and so forth. Code adapted to provide the systems and methods described above may be provided on many different types of computer-readable media including computer storage mechanisms (e.g., CD-ROM, diskette, RAM, flash memory, computer hard drive, etc.) that contain instructions for use in execution by one or more processors to perform the operations described herein. The media on which the code may be provided is generally considered to be non-transitory or physical.

Computer components, software modules, engines, functions, and data structures may be connected directly or indirectly to each other in order to allow the flow of data needed for their operations. Various functional units have been expressly or implicitly described as modules, engines, or similar terminology, in order to more particularly emphasize their independent implementation and operation. Such units may be implemented in a unit of code, a subroutine unit, object, applet, script or other form of code. Such functional units may also be implemented in hardware circuits comprising custom VLSI circuits or gate arrays; field-programmable gate arrays; programmable array logic; programmable logic devices; commercially available logic chips, transistors, and other such components. Functional units need not be physically located together, but may reside in different locations, such as over several electronic devices or memory devices, capable of being logically joined for execution. Functional units may also be implemented as combinations of software and hardware, such as a processor operating on a set of operational data or instructions.

It should also be understood that steps and the order of the steps in the processes and methods described herein may be altered, modified and/or augmented and still achieve the desired outcome. Use of any particular term should not be construed as limiting the scope or requiring experimentation to implement the claimed subject matter or embodiments described herein. Any suggestion of substitutability of the data processing systems or environments for other implementation means should not be construed as an admission that the invention(s) described herein are abstract, or that the data processing systems or their components are non-essential to the invention(s) described herein.

A portion of the disclosure of this patent document contains material which is or may be subject to one or more of copyright, design, or trade dress protection, whether registered or unregistered. The rightsholder has no objection to the reproduction of any such material as portrayed herein through facsimile reproduction of this disclosure as it appears in the Patent Office records, but otherwise reserves all rights whatsoever.

The invention claimed is:

1. A method, comprising:
    associating a first plurality of assets with a corresponding first plurality of mobile transceivers in records stored in a data processing system, each mobile transceiver of the first plurality of mobile transceivers being physically affixed to a corresponding asset of the first plurality of assets;
    the data processing system receiving, during an evaluation term, a first plurality of messages from the first plurality of mobile transceivers, the first plurality of messages comprising asset usage statuses for the first plurality of assets;
    storing the asset usage data in the data processing system;
    the data processing system determining, using the stored asset usage data, a predicted quantity of assets $N_i$ expected to be used in a subsequent term; and
    the data processing system allocating the predicted quantity of assets $N_i$ between a first subset of assets $n_o$ and a second subset of assets $n_i$ such that $N_i = n_o + n_i$ according to a minimal cost for the predicted quantity, according to a value of $n_o$ yielding a minimum value:

$\mathrm{argmin}_{n_o} [\Sigma_{i=0}^{p}(C_o n_o + C_r n_i)]$ where $0 \leq n_o \leq \max(N_i)$, wherein the first subset of assets is associated with a first cost $C_o$ and the second subset of assets is associated with a second cost $C_r$, and p is a number of use periods i in the subsequent term, the first subset of assets comprising assets associated with the first plurality of mobile transceivers, the second subset of assets comprising assets not currently associated with any mobile transceivers transmitting messages to the data processing system.

2. The method of claim 1, wherein when a number of assets in the first subset of assets is greater than a number of assets in the first plurality of assets,
    associating a second plurality of assets with a corresponding second plurality of mobile transceivers in records stored in the data processing system, each mobile transceiver of the second plurality of mobile transceivers being physically affixed to a corresponding asset of the second plurality of assets; and
    including the second plurality of assets in the first subset of assets.

3. The method of claim 1, further comprising:
    associating a further plurality of assets with a corresponding further plurality of mobile transceivers in records stored in a data processing system, each mobile transceiver of the further plurality of mobile transceivers being physically affixed to a corresponding asset of the further plurality of assets;
    the data processing system receiving, during the evaluation term, a further plurality of messages from the further plurality of mobile transceivers, the further plurality of messages comprising further asset usage statuses for the further plurality of assets;
    storing the further asset usage data in the data processing system;
    the data processing system determining, using the stored further asset usage data, a predicted quantity of unused assets of the further plurality of assets that are expected to be unused in the subsequent term;
    when a number of assets in the first subset of assets is greater than a number of assets in the first plurality of assets, including at least some of the assets of the further plurality of assets in the first subset of assets.

4. The method of claim 1, wherein the first cost is less than the second cost.

5. The method of claim 1, wherein the assets comprise shipping containers, and the asset usage statuses comprise statuses corresponding to a shipping container in use, and at least one status corresponding to a shipping container not in use, and wherein the predicted quantity of assets is determined at least in part from a number of assets in the first plurality of assets having a status corresponding to a shipping container in use during the evaluation period.

6. The method of claim 5, wherein the statuses corresponding to a shipping container in use comprise exit from a geofenced region, entrance into a geofenced region, and door open.

7. The method of claim 1, wherein:
    the evaluation period and the subsequent period each comprises a set of use periods;
    the messages of the first plurality of messages are received during each of the use periods from each of the assets of the first plurality of assets; and
    determining the predicted quantity of assets expected to be used in the subsequent term comprises determining a predicted quantity of assets expected to be used for each use period of the subsequent period based on the stored asset usage data for the corresponding use period of the evaluation period.

8. The method of claim 1, wherein determining the predicted quantity of assets expected to be used in the subsequent term further comprises adjusting an initial predicted quantity of assets based on the stored asset usage data according to external information about either a predicted increase or a predicted decrease in usage of assets for the subsequent term.

9. The method of claim 7, wherein determining the predicted quantity of assets expected to be used in the subsequent term further comprises adjusting an initial predicted quantity of assets for a selected use period according to external information about either a predicted increase or a predicted decrease in usage of assets for the selected use period.

10. A data processing system, comprising:
at least one data storage system;
at least one network communications system; and
at least one data processor in operable communication with the at least one data storage system and the at least one network communications system, the at least one data processor being configured to:
associate a first plurality of assets with a corresponding first plurality of mobile transceivers in records stored in a data processing system, each mobile transceiver of the first plurality of mobile transceivers being physically affixed to a corresponding asset of the first plurality of assets;
receive via the at least one network communications system, during an evaluation term, a first plurality of messages from the first plurality of mobile transceivers, the first plurality of messages comprising asset usage statuses for the first plurality of assets;
store the asset usage data in the at least one data storage system;
determine, using the stored asset usage data, a predicted quantity of assets $N_i$ expected to be used in a subsequent term; and
allocate the predicted quantity of assets $N_i$ between a first subset of assets $n_o$ and a second subset of assets $n_i$ such that $N_i = n_o + n_i$ according to a minimal cost for the predicted quantity, according to a value of $n_o$ yielding a minimum value:

$$\mathrm{argmin}_{n_o}[\Sigma_{i=0}^{p}(C_o n_o + C_r n_i)] \text{ where } 0 \leq n_o \leq \max(N_i),$$

wherein the first subset of assets is associated with a first cost $C_o$ and the second subset of assets is associated with a second cost $C_r$ and p is a number of use periods i in the subsequent term, the first subset of assets comprising assets associated with the first plurality of mobile transceivers, the second subset of assets comprising assets not currently associated with any mobile transceivers transmitting messages to the data processing system.

11. The data processing system of claim 10, wherein when a number of assets in the first subset of assets is greater than a number of assets in the first plurality of assets, the at least one data processor is further configured to:
associate a second plurality of assets with a corresponding second plurality of mobile transceivers in records stored in the data processing system, each mobile transceiver of the second plurality of mobile transceivers being physically affixed to a corresponding asset of the second plurality of assets; and
include the second plurality of assets in the first subset of assets.

12. The data processing system of claim 10, wherein the one data processor is further configured to:
associate a further plurality of assets with a corresponding further plurality of mobile transceivers in records stored in a data processing system, each mobile transceiver of the further plurality of mobile transceivers being physically affixed to a corresponding asset of the further plurality of assets;
receive, during the evaluation term, a further plurality of messages from the further plurality of mobile transceivers, the further plurality of messages comprising further asset usage statuses for the further plurality of assets;
store the further asset usage data;
determine, using the stored further asset usage data, a predicted quantity of unused assets of the further plurality of assets that are expected to be unused in the subsequent term;
when a number of assets in the first subset of assets is greater than a number of assets in the first plurality of assets, include at least some of the assets of the further plurality of assets in the first subset of assets.

13. The data processing system of claim 10, wherein the first cost is less than the second cost.

14. The data processing system of claim 10, wherein the assets comprise shipping containers, and the asset usage statuses comprise statuses corresponding to a shipping container in use, and at least one status corresponding to a shipping container not in use, and wherein the predicted quantity of assets is determined at least in part from a number of assets in the first plurality of assets having a status corresponding to a shipping container in use during the evaluation period.

15. The data processing system of claim 14, wherein the statuses corresponding to a shipping container in use comprise exit from a geofenced region, entrance into a geofenced region, and door open.

16. The data processing system of claim 10, wherein:
the evaluation period and the subsequent period each comprises a set of use periods;
the messages of the first plurality of messages are received during each of the use periods from each of the assets of the first plurality of assets; and
determining the predicted quantity of assets expected to be used in the subsequent term comprises determining a predicted quantity of assets expected to be used for each use period of the subsequent period based on the stored asset usage data for the corresponding use period of the evaluation period.

17. The data processing system of claim 10, wherein determining the predicted quantity of assets expected to be used in the subsequent term further comprises adjusting an initial predicted quantity of assets based on the stored asset usage data according to external information about either a predicted increase or a predicted decrease in usage of assets for the subsequent term.

18. The data processing system of claim 16, wherein determining the predicted quantity of assets expected to be used in the subsequent term further comprises adjusting an initial predicted quantity of assets for a selected use period according to external information about either a predicted increase or a predicted decrease in usage of assets for the selected use period.

19. The data processing system of claim 10, further comprising the first plurality of mobile transceivers.

20. A non-transitory computer readable medium comprising code which, when executed by at least one processor of a data processing system, causes the data processing system to implement the method of:
associating a first plurality of assets with a corresponding first plurality of mobile transceivers in records stored in a data processing system, each mobile transceiver of the first plurality of mobile transceivers being physically affixed to a corresponding asset of the first plurality of assets;
receiving, during an evaluation term, a first plurality of messages from the first plurality of mobile transceivers, the first plurality of messages comprising asset usage statuses for the first plurality of assets;

storing the asset usage data;

determining, using the stored asset usage data, a predicted quantity of assets $N_i$ expected to be used in a subsequent term; and allocating the predicted quantity of assets $N_i$ between a first subset of assets $n_o$ and a second subset of assets $n_i$ such that $N_i = n_o + n_i$ according to a minimal cost for the predicted quantity, according to a value of $n_o$ yielding a minimum value:

$$\mathrm{argmin}_{n_o}[\Sigma_{i=0}^{p}(C_o n_o + C_r n_i)] \text{ where } 0 \leq n_o \leq \max(N_i),$$

wherein the first subset of assets is associated with a first cost $C_o$ and the second subset of assets is associated with a second cost $C_r$ and p is a number of use periods i in the subsequent term, the first subset of assets comprising assets associated with the first plurality of mobile transceivers, the second subset of assets comprising assets not currently associated with any mobile transceivers transmitting messages to the data processing system.

* * * * *

UNITED STATES PATENT AND TRADEMARK OFFICE
CERTIFICATE OF CORRECTION

PATENT NO. : 10,839,472 B2
APPLICATION NO. : 15/971615
DATED : November 17, 2020
INVENTOR(S) : Sameh Ayoub It is certified that error appears in the above-identified patent and that said Letters Patent is hereby corrected as shown below:

In the Specification

Column 5, Line 53, delete "+10%" and insert therefor --±10%--.

In the Claims

Column 11, Line 55, delete "$\text{argmin}_{n_o}[\Sigma_{i=0}{}^P(C_o n_o + C_r n_i)]$ where $0 \leq n_o \leq \max(N_i)$" and insert therefor --$\text{argmin}_{n_o}[\Sigma_{i=0}^{p}(C_o n_o + C_r n_i)]$ where $0 \leq n_o \leq \max(N_i)$--;

Column 13, Line 32, delete "$\text{argmin}_{n_o}[\Sigma_{i=0}{}^P(C_o n_o + C_r n_i)]$ where $0 \leq n_o \leq \max(N_i)$" and insert therefor --$\text{argmin}_{n_o}[\Sigma_{i=0}^{p}(C_o n_o + C_r n_i)]$ where $0 \leq n_o \leq \max(N_i)$--; and Column 15, Line 10, delete "$\text{argmin}_{n_o}[\Sigma_{i=0}{}^P(C_o n_o + C_r n_i)]$ where $0 \leq n_o \leq \max(N_i)$" and insert therefor --$\text{argmin}_{n_o}[\Sigma_{i=0}^{p}(C_o n_o + C_r n_i)]$ where $0 \leq n_o \leq \max(N_i)$--.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*